(12) United States Patent
Li

(10) Patent No.: US 8,687,141 B2
(45) Date of Patent: Apr. 1, 2014

(54) BACKLIGHT MODULE AND LIQUID CRYSTAL DISPLAY

(75) Inventor: Quan Li, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 232 days.

(21) Appl. No.: 13/203,478

(22) PCT Filed: Jul. 19, 2011

(86) PCT No.: PCT/CN2011/077301
§ 371 (c)(1),
(2), (4) Date: Aug. 25, 2011

(87) PCT Pub. No.: WO2013/007034
PCT Pub. Date: Jan. 17, 2013

(65) Prior Publication Data
US 2013/0016304 A1 Jan. 17, 2013

(30) Foreign Application Priority Data
Jul. 14, 2011 (CN) ...................... 2011 2 0248826 U

(51) Int. Cl.
*G02F 1/1333* (2006.01)

(52) U.S. Cl.
USPC .............................................. 349/60; 349/58

(58) Field of Classification Search
USPC ..................................................... 349/58, 60
See application file for complete search history.

(56) References Cited

U.S. PATENT DOCUMENTS

2011/0242433 A1* 10/2011 Yamasaki et al. ............. 348/739

FOREIGN PATENT DOCUMENTS

| CN | 1648743 | A | 8/2005 |
|----|---------|---|--------|
| CN | 201133990 | Y | 10/2008 |
| CN | 101589267 | A | 11/2009 |
| CN | 101608651 | A | 12/2009 |
| CN | 101932871 | A | 12/2010 |
| CN | 201803229 | U | 4/2011 |
| WO | WO2006080201 | A1 | 8/2006 |

OTHER PUBLICATIONS

Zhou Yu, the International Searching Authority written comments, Apr. 2012, CN.

* cited by examiner

*Primary Examiner* — Phu Vu
(74) *Attorney, Agent, or Firm* — IPro, Inc.; Na Xu

(57) ABSTRACT

The present invention discloses a backlight module and a liquid crystal display (LCD) thereof. The backlight module comprises a backplane and a heatsink plate attached to the backplane, and the backlight module of the LCD also comprises at least one press plate, wherein the press plate is attached to the heatsink plate to tightly press the heatsink plate against the backplane. Because a press plate is added in the present invention to tightly press the heatsink plate, the press plate reduces the gaps formed between the places away from the attaching points because of small pressure. Therefore, thermal contact resistance is reduced, the heat in the cavity of the backlight is conducted to the metal backplane in time, and the temperature of the backlight module is reduced.

17 Claims, 3 Drawing Sheets

BACKLIGHT MODULE AND LIQUID CRYSTAL DISPLAY

TECHNICAL FIELD

The present invention relates to the field of liquid crystal displays (LCDs), particularly to a backlight module and a LCD thereof.

BACKGROUND

The backlight module is one of the key components of the LCD, and is mainly used for providing a light source with sufficient brightness and uniformly distributed luminance to enable a LCD panel to display images normally.

In the Light Emitting Diode (LED) backlight, because the rise of temperature has an influence on the life and the light-emitting efficiency of the LED, people need to use a heatsink plate to transfer the heat generated by the PN junction of the LED to a metal backplane, and then the heat is dissipated through heat convection between the backplane and the outside. Thermal contact resistance exists in the contact interface between the heatsink plate and the backplane, which influences the heat transfer. At present, the heatsink plate is attached to the metal backplane by screws; because the number of screws is limited, there is usually a large gap between the heatsink plate and the backplane in the area without screws where there is not enough pressure limitation; as air with low thermal conductivity exists in the gap, the thermal contact resistance is high and the heat transfer effect is influenced.

SUMMARY

The aim of the present invention is to provide a backlight module and a LCD thereof with better heat dissipation effect.

The purpose of the present invention is achieved by the following technical schemes.

A backlight module comprises a backplane and a heatsink plate attached to the backplane, and the backlight module of the LCD also comprises at least one press plate, wherein the press plate is attached to the heatsink plate to tightly press the heatsink plate against the backplane.

Preferably, the press plate is an elastic component, and the bottom surface between the two adjacent attaching points of the press plate has a convex structure. The convex structure arranged on the bottom surface of the elastic press plate produces pressure onto the heatsink plate when both ends are tightly pressed; this makes up for the loose attachment of the heatsink plate to the backplane in some area that, because of the lack of attaching points, produces gaps that has high thermal contact resistance.

Preferably, there are multiple press plates, and both ends of each press plate are respectively provided with the attaching points for attaching the press plate. The singly manufactured press plate is suitable for use when the attaching points are at different positions.

Preferably, the press plate is provided with multiple attaching points for attaching the press plates; and each bottom surface facing the press plate has a convex structure between every two adjacent attaching points. The integrally manufactured press plate uses fewer parts and is convenient for installation.

Preferably, the convex structure has a convex arc in the direction of the heatsink plate. The pressing force from around the attaching points is large, while the pressing force away from the attaching points is mall. The arc surface enables the pressure to be uniformly distributed, to avoid producing large gaps between the heatsink plate and the backplane.

Preferably, the convex structure is a horizontal lug boss perpendicular to the line connecting the two adjacent attaching points, which is equal to increasing the distribution of the attaching points to enable the heatsink plate to be pressed by multiple points and pressed against the backplane more tightly.

Preferably, the press plate is a bar-shaped plate; its top surface is a flat surface, and its bottom surface is a convex arc surface; said bottom surface of the attached press plate is in tight contact of the heatsink plate. The top surface is a flat surface that ensures the structural strength of the press plate, and the press plate produces strong pressing force when both ends are pressed tightly.

Preferably, the press plate is a bar-shaped plate. The bottom surface formed by a downwards concave part between the two adjacent attaching points of the press plate is a convex arc surface, and the top surface is a concave arc surface; said bottom surface of the attached press plate is in tight contact of the heatsink plate. The bar-shaped plate is concave between the two adjacent attaching points, which is convenient for processing. Meanwhile, the bar-shaped plate can provide strong pressing force as long as the rigidity is sufficient.

Preferably, the convex structure has multiple protrusions on the side of the press plate close to the heatsink plate. The arrangement of the protrusions is equal to increasing the number of the attaching points.

Preferably, the bottom surfaces with multiple protrusions are on the same curve plane. The pressing force of the place close to the attaching points is stronger than that of the place away from the attaching points; therefore, the heights of the protrusions on the curve plane are gradually reduced to enable the pressing force to be uniform.

A LCD uses the aforementioned backlight module, wherein the backlight module comprises a backplane and a heatsink plate attached to the backplane; said backlight module of the LCD also comprises at least one press plate, wherein said press plate is attached to the heatsink plate to tightly press the heatsink plate and the backplane.

Because the press plate is added on the heatsink plate of the present invention, the pressing force from the press plate applies pressure at positions without the attaching points, so that the heatsink plate can be pressed against the backplane; this reduces the high thermal resistance caused by large gaps in prior art. Thus, the heatsink plate can transfer heat to the backplane faster, and reduces the temperature in the cavity of the backlight.

Where: 1. backplane; 2. heatsink plate; 3. press plate; 4. screw; 5. light guide bar; 6. LED light shade; 7. screw hole; 10. curve surface; 11. lug boss; 12. protrusion.

DETAILED DESCRIPTION

The invention will further be described in detail in accordance with the figures and the preferred embodiments.

Figure 1:
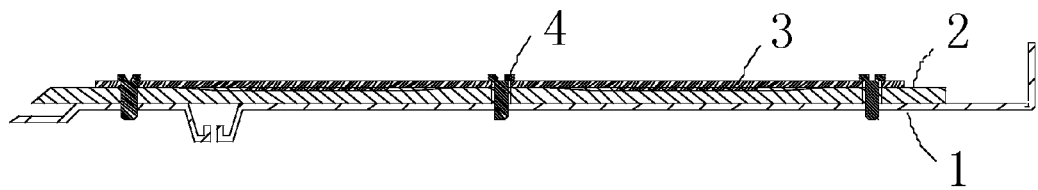
FIG. 1 is the horizontal sectional view of one embodiment of the present invention.
Figure 2:
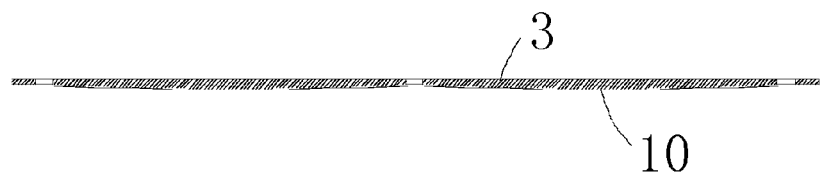
FIG. 2 is the horizontal sectional view of the press plate of one embodiment of the present invention.
Figure 3:
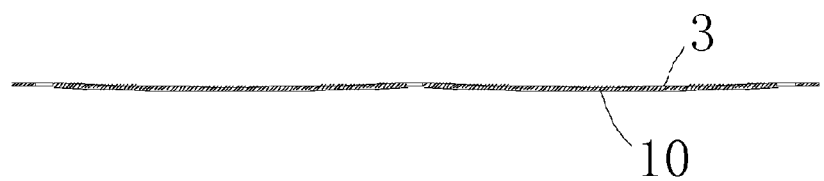
FIG. 3 is the horizontal sectional view of one press plate of one embodiment of the present invention.
Figure 4:
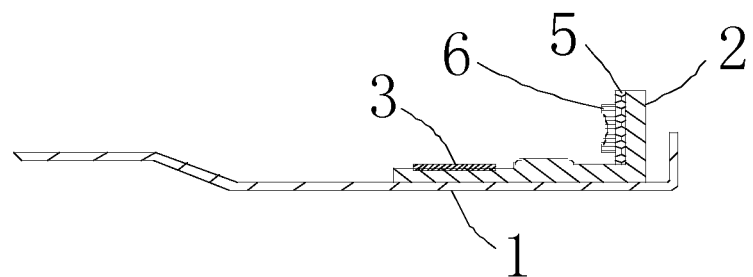
FIG. 4 is the vertical sectional view of one embodiment of the present invention.

As shown in FIG. 1 and FIG. 4, heating components that include an LED light, an LED light shade 6, a light guide bar 5, etc. of the backlight module are installed on the heatsink plate; the heatsink plate 2 is installed on the backplane 1; and the backlight module is also provided with a press plate 3 attached to the heatsink plate 2 through screws 4 or other modes, such as rivets, etc. As shown in FIG. 2, the press plate 3 is a bar-shaped plate that is provided with screw holes or through holes corresponding to the attaching points of the heatsink plate 2 and the backplane 1; and the press plate 3 is attached to the heatsink plate 2 through screws. In order to tightly press the heatsink plate 2, the bottom surface of the press plate 3 contacting with the heatsink plate 2 is provided with a downwards convex arc surface; the arc surface is positioned between two adjacent screw holes; the arc surface extends to the screw holes on both sides; and the press plate 3 is an elastic component. As shown in FIG. 3, the press plate 3 can also be an elastic bar-shaped plate that is of a downward concave part between two adjacent attaching points. Because the positions of the two screw holes in the press plate 3 are slightly lower than the position of the arc surface of the bottom surface, when the screws are tightened, the convex curve surface is in tight contact of the heatsink plate and produces downward pressure onto the heatsink plate to conduct micro interference with the heatsink plate 2 under the action of the elastic force. Thus, the bottom surface of the heatsink plate is tight contact of the backplane, which reduces the gap formed because of the loose attachment in prior art; and thermal resistance is reduced because of the gap reduction so that the efficiency of heat transfer from the heatsink plate to the backplane becomes higher.

Figure 5:
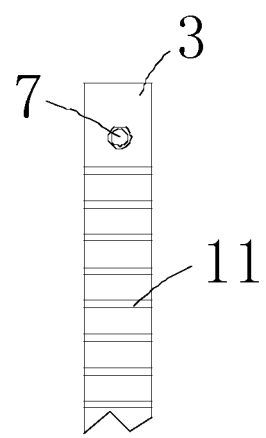
FIG. 5 is the partial view of one press plate of one embodiment of the present invention.
Figure 6:
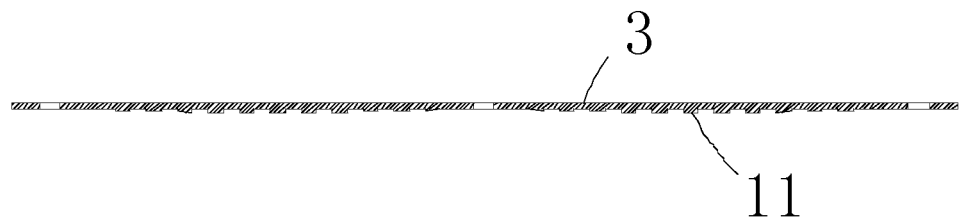
FIG. 6 is the horizontal sectional view of one press plate of one embodiment of the present invention.
Figure 7:
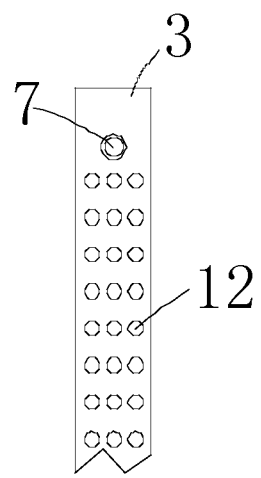
FIG. 7 is the partial view of one press plate of one embodiment of the present invention.

Because screws are used for attaching the press plate at the attaching points, the pressure near and around the attaching points is high; and then the pressure at the attaching points of the press plate 3 is high; and the pressure away from the attaching points is low. Because the highest point of the arc surface of the press plate 3 is away from the attaching points, the arc surface is subject to high pressure because of its high altitude; therefore, the position away from the attaching points is subject to high pressure as well. The height is gradually reduced to both sides, so that the whole heatsink plate is subject to more uniform stress, and this makes up to the fact that the screws only tightly press the area near the screw holes. In addition to arranging convex arc surface on the bottom surface of the press plate, the bottom surface of the press plate can also be processed with horizontal lug bosses 11 (as shown in FIG. 5, FIG. 6 and FIG. 7) perpendicular to the line of two adjacent screw holes, the lug bosses 11 whose heights are gradually reduced are arranged from the central part between two adjacent screw holes to the screw holes on both sides, and the heights of the lug bosses 11 on both sides which are symmetrical relative to the middle are equal; and the lug bosses whose heights are gradually reduced enable the heatsink plate 2 to be subject to more uniform stress. The lug bosses 11 are equivalent to adding screws. In a similar way, the bottom surface of the press plate 3 can be provided with protrusions (as shown in FIG. 6 and FIG. 7) and other arrangements.

Multiple press plates can be used in accordance with the number and positions of the attaching points (i.e. screw holes) set on the backplane. Both ends of all press plates are respectively provided with attaching points for installing the press plates at different positions. Alternatively, one press plate can be provided with multiple attaching points as well, and between two adjacent attaching points the bottom surface in contact of the heatsink plate is provided with convex structures, which reduces the number of parts and provides convenience for installation.

The present invention is described in detail in accordance with the above contents with the specific preferred embodiments. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

I claim:

1. A backlight module, comprising: a backplane, and a heatsink plate attached to the backplane; said backlight module also comprises at least one press plate, said press plate is attached to the heatsink plate to tightly press the heatsink plate against the backplane, wherein said press plate is an elastic component, and the bottom surface between two adjacent attaching points of the press plate has a convex structure facing to the heatsink plate.

2. The backlight module of claim 1, wherein there are multiple press plates, and both ends of each press plate are respectively provided with the attaching points for attaching the press plate.

3. The backlight module of claim 1, wherein said press plate is provided with multiple attaching points for attaching the press plate, and the bottom surface facing the heatsink plate has a convex structure between every two adjacent attaching points.

4. The backlight module of claim 1, wherein said convex structure has a convex arc in the direction of the heatsink plate.

5. The backlight module of claim 4, wherein said press plate is a bar-shaped plate; its top surface is a flat surface; its bottom surface is a convex arc surface; and the bottom surface of the press plate is in tight contact of the heatsink plate after being attached.

6. The backlight module of claim 4, wherein said press plate is a bar-shaped plate; the part between the two adjacent attaching points of the press plate is downwards concave, wherein the bottom surface of the downwards concave is a convex arc surface and the top surface of the downwards concave is a concave arc surface; and the bottom surface of the press plate is in tight contact of the heatsink plate after being attached.

7. The backlight module of claim 1, wherein said convex structure is provided with multiple protrusions on the side of the press plate that is in tight contact of the heatsink plate.

8. The backlight module of claim 1, wherein said bottom surfaces of the multiple protrusions are on the same curve plane.

9. A liquid crystal display (LCD) comprising a backlight module, the backlight module comprises a backplane, and a heatsink plate attached to the backplane; said backlight module of the LCD also comprises at least one press plate, said press plate is attached to the heatsink plate to tightly press the heatsink plate against the backplane, wherein said press plate is an elastic component, and the bottom surface between two adjacent attaching points of the press plate has a convex structure.

10. The LCD of claim 9, wherein there are multiple press plates, and both ends of each press plate are respectively provided with the attaching points for attaching the press plate.

11. The LCD of claim 9, wherein said press plate is provided with multiple attaching points for attaching the press plate, and the bottom surface facing the heatsink plate has a convex structure between every two adjacent attaching points.

12. The LCD of claim 9, wherein said convex structure has a convex arc in the direction of the heatsink plate.

13. The LCD of claim 12, wherein said press plate is a bar-shaped plate; its top surface is a flat surface; its bottom surface is a convex arc surface; and the bottom surface of the press plate is in tight contact of the heatsink plate after being attached.

14. The LCD of claim 12, wherein said press plate is a bar-shaped plate; the part between the two adjacent attaching points of the press plate is downwards concave, wherein the bottom surface of the downwards concave is a convex arc surface and the top surface of the downwards concave is a concave arc surface; and the bottom surface of the press plate is in tight contact of the heatsink plate after being attached.

15. The LCD of claim 9, wherein said convex structure is provided with multiple protrusions on the side of the press plate that is in tight contact of the heatsink plate.

16. The LCD of claim 9, wherein said bottom surfaces with multiple protrusions are on the same curve plane.

17. A backlight module, comprising: a light guide bar, a metal backplane, and a heatsink plate attached to the backplane, the heatsink plate directly contacts and supports the light guide bar and dissipates heat generated by the light guide bar; said backlight module also comprises at least one press plate, and said press plate is attached to the heatsink plate to tightly press the heatsink plate against the backplane.

* * * * *